United States Patent Office 3,726,817
Patented Apr. 10, 1973

3,726,817
SURFACE COATING COMPOSITIONS COMPRISING POLYESTER RESIN, WAX AND FLOCK AND COATINGS THEREOF
Dewey F. Niswonger, P.O. Box 1762, Redding, Calif. 96001
No Drawing. Filed Nov. 3, 1971, Ser. No. 195,447
Int. Cl. C08g 51/18
U.S. Cl. 260—9    12 Claims

ABSTRACT OF THE DISCLOSURE

A curable surface coating composition comprising an unsaturated polyester resin, natural wax particles and flock which is mixed with a curing catalyst such as methyl ethyl ketone peroxide and poured or sprayed as a thin layer onto a concrete, wood or metal substrate and allowed to cure. The cured coatings are waterproof, strongly bonded to the substrate and have a low coefficient of friction, making them ideal for use as artificial skating surfaces.

BACKGROUND OF THE INVENTION

This invention relates to surface coating compositions and the coatings formed therefrom. More particularly it relates to surface coating compositions comprising a polyester resin, wax and flock which cure to hard, low coefficient of friction surfaces which are especially useful as ice skating surfaces.

A wide variety of surfaces have previously been suggested as a replacement for ice as a skating surface. Most recently, U.S. Pat. 3,508,945 has suggested using a porous polymer sheet with at least the surface pores thereof filled with a silicone lubricant. Such a sheet has the disadvantage that the amount of surface lubricant must be carefully monitored or the surface will lose its skatability. Also, if used outside the surface has to be waterproofed in some manner.

The present invention employs a specific mixture of three ingredients to form a strong, resilient, waterproof surface with improved skatability characteristics which may be used inside or outdoors over a wide temperature spectrum without a surface lubricant. In addition this unique mixture may be used for a variety of other surface applications such as roller skating surfaces, deck, flooring or panelling coatings, waterproof lumber and concrete block coatings and swimming pool coatings.

SUMMARY OF THE INVENTION

The curable surface coating compositions of the invention comprise a homogeneous mixture of about 60 to 90% by weight curable solution of an unsaturated polyester resin in styrene, about 5% to 35% by weight normally solid, natural wax particles and about 4% to 6% by weight flock. When used for coatings which will be exposed to substantial sunlight the composition will also contain a sufficient amount of an ultraviolet light stabilizer to prevent the coating from undergoing substantial U.V. degradation. Surface coatings of these compsitions are formed by mixing a curing catalyst with the composition, applying a layer of the composition-catalyst mixture to a substrate and allowing the layer to cure to a hard, resilient coating. If the coating is to be used as a skating surface it is desirable, although not necessary, to apply a thin film of an aqueous, silicone oil emulsion on top of it.

DESCRIPTION OF THE PREFERRED EMBODIMENTS

The unsaturated polyester resin of the composition of this invention is an organic acid or anhydride thereof-alkylene glycol condensation product wherein the acid (anhydride) and glycol are present in approximately equimolar portions. Generally these resins are made by reacting a mixture of an aliphatic unsaturated acid or anhydride such as maleic acid, maleic anhydride or fumaric acid and a saturated aliphatic acid or aromatic acid or anhydride thereof such as phthalic acid, phthalic anhydride, isophthalic acid, adipic acid, succinic acid and the like, wherein the mol ratio of unsaturated acid to aromatic or saturated acid is in the range of 2:1 and 1:2, usually approximately 1:1, with a diol such as ethylene glycol, propylene glycol or diethylene glycol. These polyesters are essentially linear polymers with molecular weights in the 1500 to 3000 range. Preferred resins are those made by reacting combinations of phthalic anhydride, maleic anhydride and adipic acid with ethylene glycol, propylene glycol or diethylene glycol. A preferred resin for use in compositions for skating surfaces comprises a mixture of 80% to 85% by weight of a condensation product made by reacting a mixture of phthalic anhydride and maleic anhydride with approximately an equimolar amount of propylene glycol (sold by Stepan Chemical Co. as "Polyester 5765") and 15% to 20% by weight of a condensation product made by reacting a mixture of phthaic anhydride, maleic anhydride and adipic acid with approximately an equimolar amount of diethylene glycol (sold by Stepan Chemical Co. as "Polyester 5500"). Curable solutions of these resins are made by dissolving them in a reactive monomer such as styrene-vinyl chloride or an acrylate. A preferred solution for making skating surfaces comprises the above described mixture of "Polyester 5765" and "Polyester 5500" in about 35% to 50% by weight styrene. For most coatings, compositions containing about 70% to 85% by weight of the resin solution will suffice. A particularly preferred composition for making skating surfaces contains 72% by weight of the above described styrene solution of "Polyester 5765" and "Polyester 5500."

The wax used in the composition may be any natural wax which is normally solid and which melts at the temperatures reached during the resin curing and thereby distributes itself evenly throughout the coating. Carnauba wax, montan wax and candelilla wax which melt in the range of roughly 155 to 190° F. have been found useful. Carnauba wax which melts at 180 to 187° F. is particularly useful for skating surface compositions. In the majority of coatings, about 10% to 25% by weight of such waxes will be adequate. A preferred skating surface composition contains 20% by weight of the above described carnauba wax.

The wax makes the resulting coating waterproof. It is also believed that it acts as a plasticizer and causes the coating to have a lower coefficient of friction than if it were made only of cured resin solution. The wax is used in the form of a fine powder to facilitate mixing it thoroughly and evenly with the resin.

The third component of the composition, flock, improves the tensile and tear strengths of the resulting coatings and reduces coating shrinkage during curing. The flock may be a natural or synthetic fibrous material such as rayon, cotton or glass with an average fiber length in the 0.040 to 0.080 inch range. Its denier will usually be in the 5 to 6 range.

Ultraviolet stabilizers may be added to the composition if it is to be used to form a coating which will be subjected to substantial sunlight. Any of the U.V. stabilizers known in the art for use with polyesters and which blend homogeneously with the composition may be used. Such stabilizers include various hydroxylated benzophenones such as 2,4-dihydroxy-benzophenone, 2-hydroxy-4-methoxy-benzophenone, 4-dodecyloxy-2-hydroxy-benzophenone, hydroxylated benzotriazole such as 2-(2'-hydroxy- 5'-methylphenyl) benzotriazole, 2-(3',5'-di-tert.-butyl-2'-hydroxyphenyl)-5-chlorobenzotriazole, 2 - (3'-tert.-butyl-2'-hydroxy-5'-methylphenyl)-5-chlorobenzotriazole, salicylates such as phenyl salicylate, and acrylonitriles such as 2-octyl-2-cyano-3, 3-diphenyl acrylate, and ethyl-2-cyano-3,3-diphenyl acrylate. About 1% to 5% by weight stabilizer will usually be sufficient to significantly reduce degradation of the coatings.

The resin solution, wax, flock and U.V. stabilizer (if necessary may be blended into a flowable mixture as follows. The polyester resin solution is first charged to a suitable mixing vat and the wax (pre-screened to remove large lumps and the like) is then added. After the resin solution and wax have been thoroughly mixed to a smooth, even liquid the U.V. stabilizer may be added. It too must be evenly blended into the mix. The last step is blending the flock into the mix. This may be done as part of the initial formulation or at the time the composition is to be applied to the substrate.

Prior to application to the desired substrate the curing catalyst (a free radical initiator) and a small amount of metal catalyst such as cobalt naphthenate which reacts with the curing catalyst to initiate the free radical reaction is blended into the composition. The curing is an exothermic cross-linking reaction between the linear polyester and the reactive monomer solvent. The metal catalyst is usually blended into the composition before the curing catalyst (most commercial resins contain a small amount as sold). Concentrated mixtures of the curing catalyst and metal catalyst may be explosive and should be avoided. The amount of catalyst added will depend upon the application temperature (normally ambient) and the desired resin gel time and cure time. More than 2% or less than 0.25%, based on the resin solution weight, will rarely, if ever, be required. Typically about 1% will be used for ambient temperature-curing. High catalyst concentrations within the above range may be used for applying thin coatings which permit rapid heat dissipation, whereas lower concentrations in the above range should be employed for thicker coatings from which heat transfer will be slow. In general most organic peroxide free radical catalysts may be used. Methyl ethyl ketone peroxide is preferred.

The catalyst-containing composition may be applied to the desired substrate by pouring or spraying. In both types of application is is essential that the substrate be properly prepared to insure a strong bond between it and the coating. There are three main types of substrates to which the compositions may be applied: concrete, wood and metal. Each requires a different preparation. However, in general, they all must be clean, dry and sound, have a suitable texture and not be subject to hydrostatic pressure from ground water.

New concrete should have a smooth steel trowel finish and be at least thirty days old. Laitence (the thin skin of cured cement that lies on the concrete surface) must be removed by mechanical means such as grinding or sand blasting or by acid etching with a dilute (10%) aqueous solution of hydrochloric acid. Old concrete floors must be thoroughly cleaned to remove contaminants such as oil, grease, wax, soap, and the like. A solvent wash followed by a strong detergent wash will usually remove such contaminants. If the concrete surface has been penetrated by these contaminants the entire contaminated layer must be removed. If the concrete is weak, due to acid etching or mechanical damage, the entire weak area must be removed. Slick, smooth trowel areas must be roughened to provide a suitable surface for the composition. The entire surface of the old concrete should be mechanically cleaned or acid etched after the contaminants are removed. Structural cracks in either old or new concrete must be cleaned out and filled with grouting.

Wood surfaces must also meet the general requirements set forth above. In general it is best to avoid coating wood surfaces that are composed of narrow pieces such as planked flooring. It is desirable to cover such surfaces with quarter-inch exterior plywood. The plywood should be sanded to roughen its surface. Any joints between the plywood sheeting should be covered with fiberglass tape.

Metal surfaces must be cleaned of rust, oil, paint, and other contaminants by sand blasting or wire brushing. It is recommended that the metal be primed with an epoxy primer containing a corrosion-resistant pigment such as zinc chromate or red lead prior to the application of the composition.

The compositions of this invention are not recommended for coating vinyl tile, linoleum, ceramic or quarry tile, asphaltic surfaces, glass, painted or varnished surfaces or mastic flooring since the bond between such substrates and the composition is poor.

The catalyst-containing composition may be poured directly onto a prepared substrate and spread thereover with a straight-edge tool. The composition should be rolled with a resin roller so that it flows into place. Generally it will flow into the desired form and seek its own level providing the substrate to which it is applied is level. Such rolling must be completed before the composition begins to gel. Under normal conditions the composition will cure between two and four hours. Curing may be speeded up or slowed by adjusting the amount of catalyst. The temperature of the substrate will influence both the gel and cure times, with low temperatures lengthening both the gel and cure times. Preferably, the composition is applied at temperatures in the range of about 50 to 90° F.

The compositions may be sprayed onto a prepared substrates using a three nozzle spray gun which simultaneously sprays the composition (minus the flock), catalyst and the flock as separate, metered, converging streams. By spraying the composition it is possible to speed up the gel and cure times considerably and there is less rolling and handling of the catalyzed composition.

The composition will normally be applied by either pouring or spraying as a uniform layer about $\frac{1}{32}$ to $\frac{3}{4}$ inch thick. For synthetic ice skating surfaces, a thickness of about $\frac{1}{4}$ to $\frac{3}{8}$ inch is preferable.

If the surface is to be used for skating a light sanding of the cured surface will produce a more desirable skating surface. The equivalent of such sanding will eventually be obtained by the effect of the skates on the surface, but the same may be achieved faster by such sanding.

The following examples illustrate the formulation and application of the compositions of this invention.

EXAMPLE 1

75 lbs. of a styrene solution of "Polyester 5765" and "Polyester 5500" in an 85:15 weight ratio containing a small amount of cobalt naphthenate (approximately 39% by weight styrene) were placed in a mixing vat equipped with rotating mixers and the mixers were turned to slow speed. 19 lbs. of screened (325 mesh), powdered carnauba wax (M.P. 180–187° F.) were added to the vat and mixed with the resin for 5 to 10 minutes until the vat's contents were a smooth, even liquid. 1 lb. of 2-(2'-hydroxy-5'-methylphenyl) benzotriazole (U.V. stabilizer) was then added to the resin solution-wax blend and mixed thoroughly therein. Finally 5 lbs. of rayon flock having an average cut length of 0.045 inch and 5.5 to 6 denier were mixed into the resin-wax-stabilizer blend.

A 8 ft. x 16 ft. plywood substrate was prepared for application of the above-described composition by sanding and cleaning its surface and forming a $\frac{1}{4}$ inch high sidewall around its periphery. The substrate was at ambient temperature (approximately 70° F.).

12½ oz. (372 cc.) of methyl ethyl ketone peroxide were added to the composition and mixed into it for 3–4 minutes. The catalyzed composition was poured out onto the substrate and spread over it with a flat rake into a layer about $\frac{1}{4}$ inch thick. The layer was then rolled with a resin roller to insure that the formulation had completely covered the substrate. Rolling was completed before the catalyzed composition began to gel. The composition gelled within 20 minutes after application and had cured completely within four hours. No discernible shrinkage occurred during curing. The Shore D Hardness of the cured layer was 75. Its coefficient of friction was determined by connecting a pair of ice skates with a 100 lb. weight placed over them and measuring the lateral force required to initiate movement of the skates across the surface. The coefficient, representing the lateral force divided by 100 lbs. was 0.2. The bond strength between the layer and substrate was excellent.

An aqueous silicone oil emulsion (35% silicone by weight) was spread over the top of the layer at a concentration of 1 gallon per 1000 sq. ft. The coefficient of friction of the surface with this emulsion, calculated as above, was 0.060. The surface provided an excellent skating surface both with and without the aqueous silicone oil emulsion and was impervious to water.

EXAMPLE 2

A resin solution-wax-U.V. stabilizer blend of the same composition as that of Example 1, is prepared. A container of this blend, together with a container of dry flock and container of methyl ethyl ketone peroxide catalyst is connected to the respective heads of a three-headed liquid sprayer. The resin solution-wax-stabilizer blend, flock and catalyst is sprayed at ambient temperature from the nozzle of the sprayer in a weight ratio of 94:5:1, respectively, evenly onto a plywood substrate as three converging streams to form a layer on the substrate about ⅛ inch thick. The layer will gel within 10 minutes after application and cure completely within 2 hours providing a skating surface with characteristics substantially the same as that of Example 1.

As evidenced by the above examples the formulations of this invention may be used as synthetic ice skating surfaces because of their low coefficient of friction, which ranges between 0.1 and 0.4 unlubricated and 0.01 to 0.1 lubricated. The hardness of the resulting coatings and their excellent bond strength to various substrates also make these compositions ideal for use as surface coatings for other applications such as those mentioned above.

Various modifications of the compositions and their application will be readily apparent to those skilled in the coating art. For instance, minor amounts of other materials such as plasticizers, pigments and the like may be added to the compositions without affecting their operability as surface coatings. It is intended that such modifications be included within the scope of the following claims.

I claim:
1. Curable surface coating composition comprising a mixture of:
   (a) about 60% to about 95% by weight curable, styrene solution of an unsaturated polyester resin, said resin being a condensation product of a mixture of an unsaturated aliphatic dicarboxylic acid or anhydride thereof and an aromatic dicarboxylic acid or anhydride thereof or saturated aliphatic dicarboxylic acid and an alkylene glycol in approximately equimolar portions;
   (b) about 5% to about 35% by weight normally solid wax particles; and
   (c) about 4% to 6% by weight natural or synthetic fiber flock.

2. The composition of claim 1 wherein:
   (d) said styrene solution of unsaturated polyester resin comprises about 70% to 85% by weight of the composition;
   (e) said wax comprises about 10% to 25% by weight of the composition; and
   (f) said flock comprises about 5% by weight of the composition.
3. The composition of claim 1 wherein:
   (d) said mixture includes about 1% to about 5% by weight ultraviolet light stabilizer.
4. The composition of claim 1 wherein:
   (d) said resin solution comprises 72% by weight of the composition;
   (e) said wax comprises 20% by weight of the composition;
   (f) said flock comprises 5% by weight of the composition; and
   (g) said composition includes 3% by weight ultraviolet light stabilizer.
5. The composition of claim 1 wherein:
   (d) said solution contains about 35% to 50% by weight styrene;
   (e) said wax is carnauba wax, montan wax or candelilla wax; and
   (f) said flock is rayon with lengths in the range of about 0.04 to 0.08 inch and a 5 to 6 denier.
6. The composition of claim 5 wherein said unsaturated acid or anhydride thereof is maleic anhydride, maleic acid or fumaric acid and said aromatic acid or saturated aliphatic acid is adipic acid, phthalic anhydride, phthalic acid, isophthalic acid or succinic acid and said alkylene glycol is propylene glycol or diethylene glycol.
7. An article comprising a substrate having thereon a coating comprising a cured, thin layer of the composition of claim 1.
8. An article comprising a substrate having thereon a coating comprising a cured, thin layer of the composition of claim 2.
9. An article comprising a substrate having thereon a coating comprising a cured, thin layer of the composition of claim 3.
10. An article comprising a substrate having thereon a coating comprising a cured, thin layer of the composition of claim 5.
11. A synthetic ice skating surface comprising:
   (a) a concrete substrate; and
   (b) a cured, thin sheet of the composition of claim 1 applied to the top of said substrate.
12. The surface of claim 11 including:
   (c) a thin film of an aqueous silicone oil emulsion applied to the top of said sheet.

References Cited

UNITED STATES PATENTS

| 3,508,945 | 4/1970 | Halmer et al. | 117—8 |
| 3,558,421 | 1/1971 | Hartzell et al. | 161—182 |

FOREIGN PATENTS

| 774,807 | 5/1957 | Great Britain | 260—28.5 A |

WILLIAM H. SHORT, Primary Examiner

E. WOODBERRY, Assistant Examiner

U.S. Cl. X.R.

117—72, 123 D, 132 B, 148, 161 K; 161—182, 214, 232, 233, 234; 260—28.5